United States Patent [19]

Cubbison, Jr.

[11] Patent Number: 4,652,701
[45] Date of Patent: Mar. 24, 1987

[54] RINGING APPLICATION CIRCUIT

[75] Inventor: Richard J. Cubbison, Jr., Westminster, Colo.

[73] Assignee: AT&T Information Systems, Inc., Holmdel, N.J.

[21] Appl. No.: 795,367

[22] Filed: Nov. 6, 1985

[51] Int. Cl.$^4$ .................... H04M 3/22; H04M 19/02
[52] U.S. Cl. .................................. 379/373; 379/382; 379/412
[58] Field of Search .......... 179/16 AA, 16 A, 18 FA, 179/18 F, 81 R, 84 R, 84 T, 70, 77, 170 NC, 170 R, 18 HB

[56] References Cited

U.S. PATENT DOCUMENTS 4,539,438 9/1985 Rosenbaum et al. .......... 179/18 FA
4,595,796 6/1986 Robra et al. .................. 179/18 FA

OTHER PUBLICATIONS

"Electronic Line Pack with Opto-Electronic Line Isolation", M. A. Patten, IBM Technical Disclosure Bulletin, vol. 20, No. 1, Jun. 1977, pp. 375–376.

"One Chip Closes in on SLIC Functions", L. Brown et al., Electronic Design, Sep. 27, 1980, pp. 85–91.

Primary Examiner—Gene Z. Rubinson
Assistant Examiner—R. Vaas
Attorney, Agent, or Firm—James M. Graziano

[57] ABSTRACT

This invention relates to line circuits and, in particular, to the apparatus contained therein for switching the ringing signal on to the communication pair which connects the line circuit to the telephone station set which it serves.

Electromechanical relays provide an ideal switching function but require a significant amount of space while semiconductor switches do not require much space but provide an imperfect switching function which adversely affects the performance characteristics of the line circuit.

The subject ringing apparatus makes use of a semiconductor switch to provide the ring relay function and incorporates additional circuitry to eliminate the difficulties associated with semiconductor switches.

4 Claims, 4 Drawing Figures

RINGING APPLICATION CIRCUIT

FIELD OF THE INVENTION

This invention relates to line circuits and, in particular, to the apparatus contained therein for switching the ringing signal on to the communication pair which connects the line circuit to the telephone station set which it serves.

BACKGROUND OF THE INVENTION

Line circuits function to interconnect a telephone station set with a business communication system. The telephone station set is connected to the line circuit via a communication pair which consists of a TIP conductor and a RING conductor. The line circuit provides a number of functions which are collectively termed the BORSHT function: battery, over voltage, ringing, supervision, hybrid, transmission.

The ringing function is ordinarily provided by an electromechanical relay, the contacts of which are connected in series between the RING conductor of the communication pair and the remainder of the line circuit. The electromechanical relay uses a normally closed contact to connect the RING conductor of the communication pair to the remainder of the line circuit and a normally open contact to connect the RING conductor of the communication pair to a source of ringing voltage. Thus, the electromechanical relay, when operated to provide the ringing signal, interrupts the connection between the RING conductor of the communication pair and the line circuit via opening the normally closed contact and instead connects the RING conductor to a source of ringing voltage via closing the normally open contact.

Electromechanical relay contacts have the advantage of presenting a very low series impedance when closed and a very high open circuit impedance when open. The contacts of the ring relay present a negligible impedance between the RING conductor and the remainder of the line circuit while the ring relay is not operated and the RING conductor is disconnected from the source of ringing voltage by an impedance that is virtually an open circuit. The disadvantage of electromechanical relays is that they occupy a significant amount of space on the line circuit board.

An alternative to the electromechanical relay is the use of a semiconductor switch to provide the ring relay function. The difficulty with semiconductor switches is that they present a small but not insignificant series impedance for a closed contact. This series impedance disrupts the longitudinal balance of the line circuit. In addition, the normally open contact of the semiconductor switch incorporates a parasitic capacitance which couples the ringing voltage to the RING conductor when the line circuit is not in the ringing state. This coupled ringing signal presents an element of noise on the communication pair which is unacceptable.

Thus, electromechanical relays provide an ideal switching function but require a significant amount of space while the semiconductor switches do not require much space but provide an imperfect switching function which adversely affects the performance characteristics of the line circuit.

SUMMARY OF THE INVENTION

The subject ringing apparatus makes use of a semiconductor switch to provide the ring relay function and incorporates additional circuitry to eliminate the difficulties associated with semiconductor switches. The semiconductor switch of the subject apparatus is connected not in series between the RING conductor and the remainder of the line circuit but in series between the source side of the RING conductor battery feed impedance and the voltage source which serves the RING conductor. Additionally, a feedback path is provided from the semiconductor switch contact to the voltage source which serves the RING conductor. This feedback path serves to provide a mechanism for correcting the imperfections inherent in semiconductor switches. This feedback path compensates for the series impedance presented in the RING conductor by the normally closed semiconductor switch contact and also cancels any ringing signals coupled to the communication pair by the parasitic capacitance imperfections in the semiconductor switch. Thus, the space saving advantage of the semiconductor switch is realized without suffering the inherent problems associated with the semiconductor switches found in prior art line circuits.

DETAILED DESCRIPTION

Figure 1:
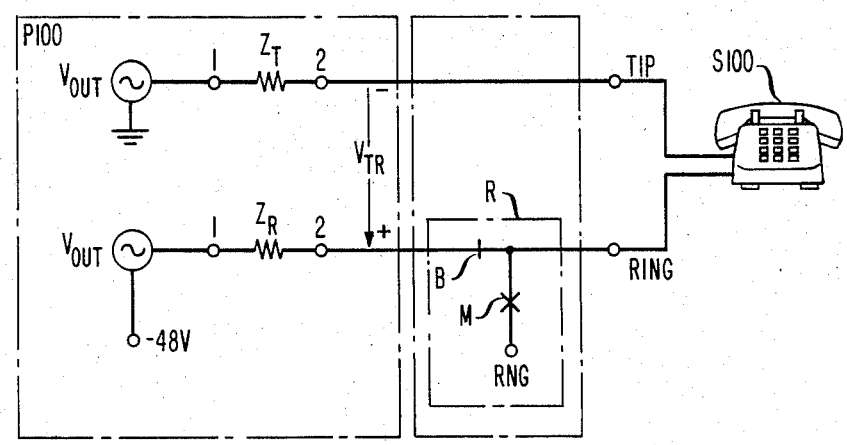
FIG. 1 illustrates in schematic form a prior art line circuit which is equipped with electromechanical relay ringing application circuit.

FIG. 1 illustrates in schemtic form a prior art line circuit which is equipped with an electromechanical ring relay. Station set S-100 is connected via the communication pair which consists of a TIP conductor and a RING conductor to the line circuit P-100. Line circuit P-100 includes a series battery feed impedance in each of the conductors. On the TIP lead this battery feed impedance is $Z_T$ and serves to connect the TIP conductor to a voltage source Vout which provides the AC voice communication voltage and the DC battery feed ground potential. The RING conductor is connected through a battery feed impedance $Z_R$ to another source of AC voice communication voltage Vout and the other DC battery feed potential of $-48$ volts.

The ring relay contacts R are illustrated in schematic form as connected between the RING conductor of the communication pair and terminal 2 of the battery feed impedance $Z_R$. The ring relay contacts consist of a normally closed contact labeled B which directly connects the RING conductor of the communication pair to terminal 2 of battery feed impedance $Z_R$. A normally open contact M of the ring relay contacts serves to bridge the RING conductor of the communication pair to a source of ringing voltage labeled RNG. In normal operation, the TIP and RING conductors are directly connected in series to the respective battery feed impedances. In the ring state the ring relay operates and normally closed contact B opens breaking the connection between the RING conductor of the communication pair and the series connected battery feed impedance $Z_R$. The RING conductor of the communication pair is connected by now closed normally open contact M to the source of ringing voltage RNG and ringing signal is applied through the RING conductor to station set S-100.

The normally closed contact B of the ring relay has a very small series impedance which, for practical purposes, can be ignored. The normally open contact M of the ring relay has a very large open circuit impedance and thus, virtually no ringing signal is coupled to the RING conductor when this contact is in the open state.

Semiconductor Switch

Figure 2:
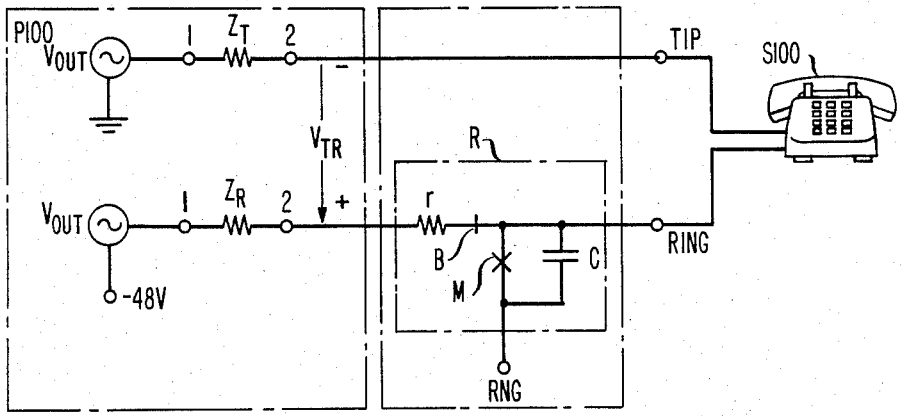
FIG. 2 illustrates in schematic form a prior art line circuit which is equipped with a semiconductor switch ringing application circuit.

FIG. 2 illustrates a prior art line circuit which makes use of a semiconductor switch to implement the ring relay function. The circuit configuration is identical to that of the electromechanical ring relay case discussed and illustrated in FIG. 1. The significant differences between FIG. 1 and FIG. 2 consists of a series impedance r associated with the normally closed contact B of the ring relay. The series impedance r of the semiconductor switch contact B is a small impedance but since it is in series with the battery feed impedance $Z_R$ which itself is fairly small in value, its effect on the operation of the line circuit is not insignificant. Series impedance r disrupts the longitudinal balance of the line circuit and allows longitudinally induced line noise to become part of the signal $V_{TR}$ which appears on the communication pair. The normally open contact M of the semiconductor switch has associated therewith a parasitic capacitance C which couples the ring signal RNG to the RING conductor at all times. This coupled signal represents a noise component of the signal $V_{TR}$ which appears on the communication pair. These two imperfections in the semiconductor switch make such a circuit undesirable for ring relay applications.

Ringing Application Circuit

Figure 3:
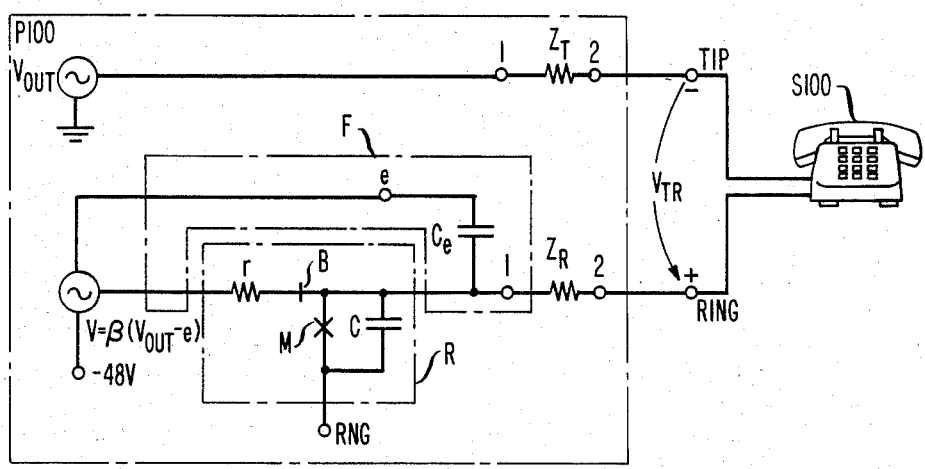
FIG. 3 illustrates in schematic form the subject ringing application circuit.

FIG. 3 illustrates the subject ringing application circuit in schematic form. As can be seen from this diagram the ring relay contacts are connected on the source side of battery feed impedance $Z_R$ as opposed to being directly connected to the RING conductor of the communication pair. The semiconductor switch contacts R are illustrated as shown in FIG. 2 with the series impedance r and the parasitic capacitance C. A feedback circuit F is connected from terminal 1 of battery feed impedance $Z_R$ to the voltage source which serves the RING conductor. This feedback circuit comprises a capacitance $C_e$ which functions to couple the signal that appears on terminal 1 of battery feed impedance $Z_R$ back to the RING conductor voltage source so that the noise signals and imperfections of the semiconductor switch can be compensated for by the voltage source. The feedback circuit F includes a voltage sense point e which indicates the AC voltage present on terminal 1 of battery feed impedance $Z_R$. The voltage source for the RING conductor is a controlled source whose output is $\beta(\text{Vout} - e)$. This controlled voltage source therefore, compensates for any undesirable signals or imperfections added to the RING conductor by the semiconductor switch contact R. This feedback mechanism senses any ringing signal coupled by the parasitic capacitance C or any voltage drop induced by the series impedance R and corrects for these imperfections by injecting a signal equal in magnitude but opposite in sense to the signals that these imperfections introduce on the RING conductor.

Figure 4:
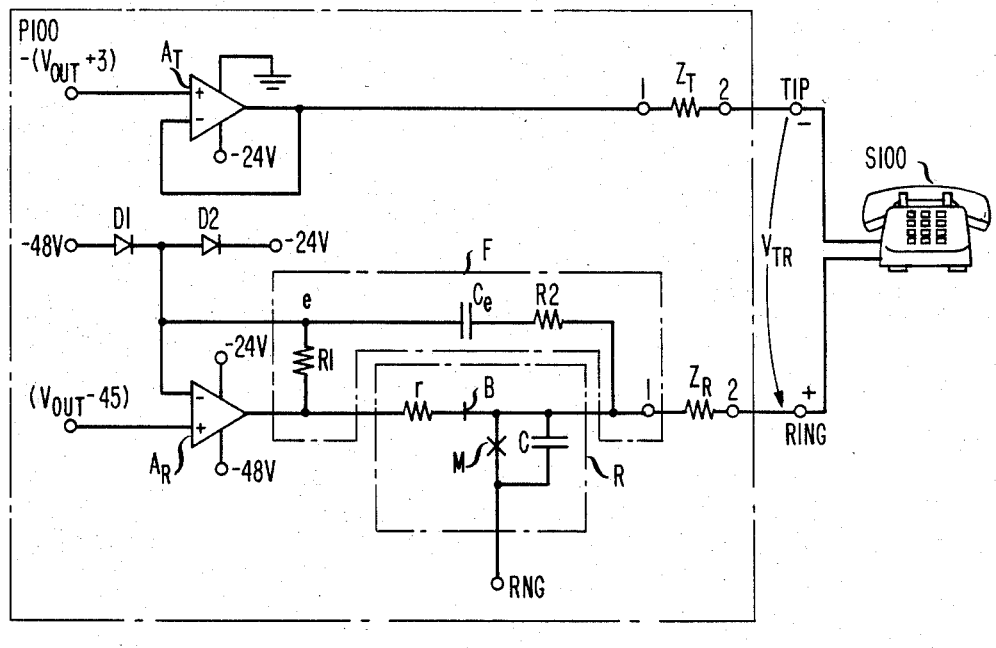
FIG. 4 illustrates in schematic form a detailed implementation of the subject ringing application circuit.

FIG. 4 illustrates in schematic form a detailed implementation of the ringing application circuit illustrated schematically in FIG. 3. The voltage source for the TIP conductor has been implemented by the use of a operational amplifier $A_T$ whose input is voltage (Vout +3). This operational amplifier is a voltage buffer which implements the controlled source Vout of FIG. 3. A 3 volt offset is introduced at its input so that the output of this operational amplifier will be biased away from the power supply rail. Similarly, the operational amplifier $A_R$ has been introduced in the RING conductor to implement the controlled voltage source V of FIG. 3. The input of this operational amplifier is (Vout −45). The operational amplifier $A_R$ is again a voltage buffer which creates the controlled source V whose output is (Vout −45) volts, which 45 volts biases the output of this operational amplifier away from the power supply rail.

Feedback circuit F as shown in FIG. 4 is realized by series connected resistor $R_2$ and capacitor $C_e$ which circuitry is connected in series between terminal 1 of battery feed impedance $Z_R$ and voltage sense terminal e. Another resistor $R_1$ is connected from the output of operational amplifier $A_R$ to voltage sense point e. $R_1$ is a large value impedance compared with $R_2$ and only serves to supply a slight amount of DC input bias current needed by the operational amplifier inverting input. Resistor $R_2$ and diodes D1 and D2 serve to protect the feedback circuit and operational amplifier $A_R$ from the magnitude of the ringing voltage and they prevent the ringing voltage RNG from being loaded down. Capacitor $C_e$ as described above couples the AC signal which appears on terminal 1 of battery feed impedance $Z_R$ back to the input of operational amplifier $A_R$. The open loop gain of operational amplifier by $A_R$ is $\beta$ and the output of operational amplifier $A_R$ is $\beta(\text{Vout} - e)$. If $\beta$ is assumed to be large, the voltage at voltage sense point e is driven to Vout. Since voltage sense point e is following the voltage at terminal 1 of ring impedance $Z_R$ 1 will be driven to Vout. Thus, the ringing application circuit of the subject invention is realized without the use of electromechanical relays and the entire circuit can be implemented in integrated circuit form to minimize the space required for the line circuit.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A telephone line circuit connected to a telephone station set by a communication pair having a first and a second lead for providing the BORSHT function to the telephone station set comprising:
   first impedance means having first and second terminals with said second terminal connected to said first lead for providing a battery feed impedance in said first lead;
   second impedance means having first and second terminals with said second terminal connected to said second lead for providing a battery feed impedance in said second lead;
   first source means connected to said first terminal of said first impedance means for providing a dc bias signal and voice signals to said first lead via said first impedance means;

second source means connected to said first terminal of said second impedance means for providing a dc bias signal and voice signals to said second lead via said second impedance means;

semiconductor switch means connected to a source of ringing signal and between said second source means and said first terminal of said second impedance means for applying said ringing signal to said first terminal of said second impedance means and for disconnecting said second source means from said first terminal of said second impedance means;

feedback means connecting said first terminal of said second impedance means to said second source means for cancelling spurious signals coupled by said semiconductor switch means to said second lead.

2. A telephone line circuit connected to a telephone station set by a communication pair having a first and a second lead for providing the BORSHT function to the telephone station set comprising:

first impedance means having first and second terminals with said second terminal connected to said first lead for providing a battery feed impedance in said first lead;

second impedance means having first and second terminals with said second terminal connected to said second lead for providing a battery feed impedance in said second lead;

first source means connected to said first terminal of said first impedance means for providing a dc bias signal and voice signals to said first lead via said first impedance means;

second source means connected to said first terminal of said second impedance means for providing a dc bias signal and voice signals to said second lead via said second impedance means;

semiconductor switch means connected to a source of ringing signal and between said second source means and said first terminal of said second impedance means for applying said ringing signal to said first terminal of said second impedance means and for disconnecting said second source means from said first terminal of said second impedance means during the ringing phase of line circuit operation;

feedback means connecting said first terminal of said second impedance means to said second source means for cancelling spurious signals coupled by said semiconductor switch means to said second lead during the non-ringing phase of line circuit operation.

3. A telephone line circuit connected to a telephone station set by a communication pair having a first and a second lead for providing the BORSHT function to the telephone station set comprising:

first impedance means having first and second terminals with said second terminal connected to said first lead for providing a battery feed impedance in said first lead;

second impedance means having first and second terminals with said second terminal connected to said second lead for providing a battery feed impedance in said second lead;

first source means connected to said first terminal of said first impedance means for providing a dc bias signal and voice signals to said first lead via said first impedance means;

second source means connected to said first terminal of said second impedance means for providing a dc bias signal and voice signals to said second lead via said second impedance means;

semiconductor switch means connected to a source of ringing signal and between said second source means and said first terminal of said second impedance means for applying said ringing signal to said first terminal of said second impedance means and for disconnecting said second source means from said first terminal of said second impedance means during the ringing phase of line circuit operation;

wherein said semiconductor switch means connects said second source means to said first terminal of said second impedance means and couples said ringing signal to said first terminal of said second impedance means through parasitic switch capacitance during the non-ringing phases of line circuit operation;

feedback means connecting said first terminal of said second impedance means to said second source means for cancelling said coupled ringing signal.

4. The circuit of claims 1 or 2 or 3 wherein:

said semiconductor switch means includes series impedance means connected between said second source means and said first terminal of said second impedance means; and said feedback means includes means for cancelling the effect of said series impedance.

* * * * *